No. 666,317. Patented Jan. 22, 1901.
R. L. KERR.
CULTIVATOR.
(Application filed Aug. 16, 1900.)
(No Model.)
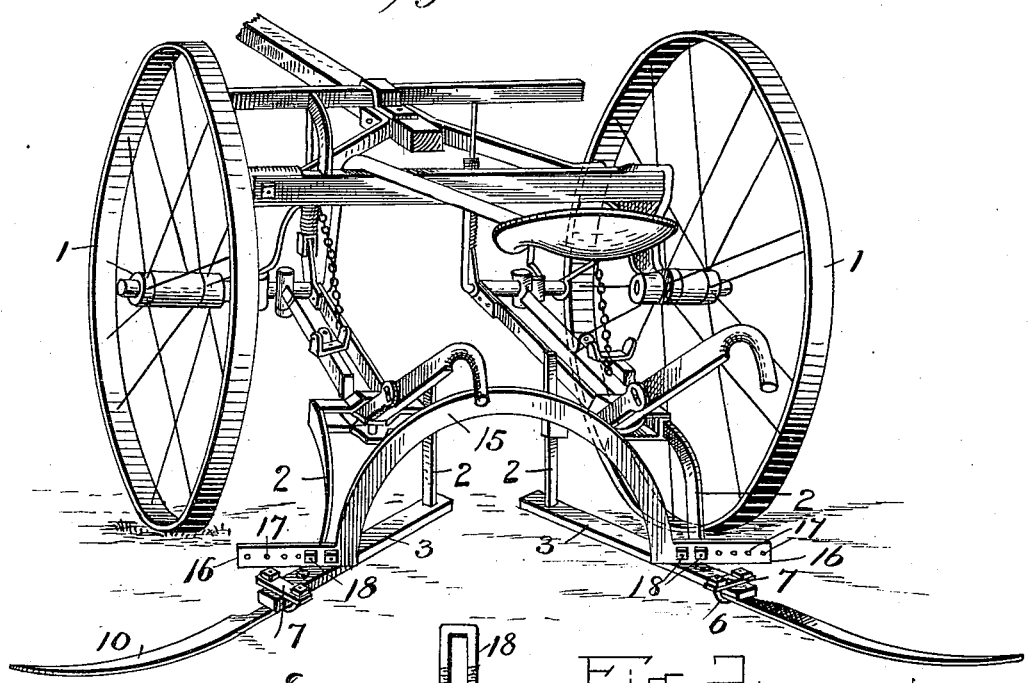
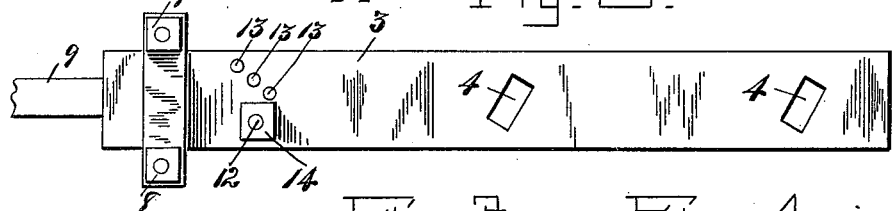
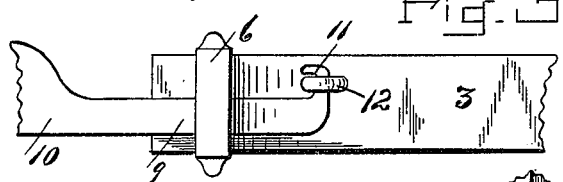 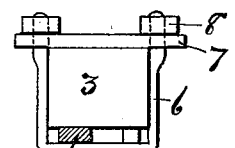
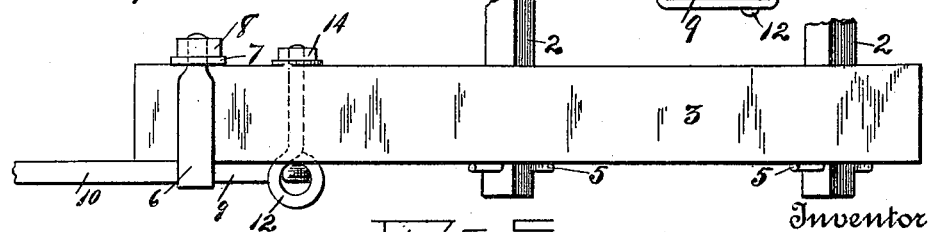
Witnesses
George Hilton
A. G. Miller
Inventor
R. L. KERR.
W. T. Fitzgerald
Attorneys.

United States Patent Office.

ROBERT LEE KERR, OF VINELAND, TEXAS.

CULTIVATOR.

SPECIFICATION forming part of Letters Patent No. 666,317, dated January 22, 1901.

Application filed August 16, 1900. Serial No. 27,034. (No model.)

*To all whom it may concern:*

Be it known that I, ROBERT LEE KERR, a citizen of the United States, residing at Vineland, in the county of Collin and State of Texas, have invented certain new and useful Improvements in Cultivators; and I do hereby declare the following to be a full, clear, and exact description of the invention, such as will enable others skilled in the art to which it appertains to make and use the same.

My invention relates to an attachment which may be applied to use upon any variety of cultivator wherein carrying-wheels are employed; and my object is to provide reliably-efficient means designed especially for cutting cotton-stalks or weeds after the cotton has been gathered, thereby removing the dry dead stalks of the cotton-plant, &c., so that the same will not prove an obstruction to the plow or will not be left standing to be cut by the reaper should a crop of wheat, oats, or the like be sown immediately after the cotton crop has been gathered.

While therefore, as above stated, the prime object of my invention is to enable the dead cotton-stalks to be expeditiously and cheaply removed, my invention will also be found desirable for cutting cornstalks after the corn crop has been gathered, thereby removing such obstruction so that the soil may be sown with small grains without the disadvantage of leaving the stalks, weeds, &c., standing in the growing crop of wheat, oats, or the like.

Other objects and advantages will be made fully apparent from the following specification, considered in connection with the accompanying drawings, in which—

Figure 1 is a perspective view showing my invention complete as applied to use upon an ordinary cultivator. Fig. 2 is a detail plan view of a portion of my invention separated from the cultivator. Fig. 3 is a detail view showing the preferred means of connecting the cutting-blade to the body portion or stalk. Fig. 4 illustrates the securing-clip employed to secure the cutting-blade in position. Fig. 5 shows an edge view of Fig. 2 after the same has been attached to the shank of a plow.

For convenience in referring to the various parts of my invention and their coöperating accessories numerals will be employed, of which 1 illustrates carrying-wheels of a cultivator of the usual or any preferred construction provided with the shanks 2, which may be of any preferred shape, size, or manufacture, and to said shanks I secure in the manner hereinafter set forth the body portion or beam 3, constituting part of my attachment.

In the beam 3 I provide the mortises 4, which are preferably obliquely disposed with respect to the longitudinal line of the beam and are designed to receive the shanks 2 of the cultivator. The shanks of most cultivators are oblong in cross-section, though many cultivators have shanks which are round or square, and it therefore only becomes necessary to so shape the openings 4 that they will correspond to the shape of the shank, as will be readily understood. The beam 3 may therefore readily be slipped upon the ends of the shanks after the shovels usually carried by said shanks have been removed, and it only becomes necessary to insert the securing-pins 5 in suitable apertures provided in the ends of the shanks in order to insure that the beams will be reliably anchored in place.

While it will be understood that any desired material may be used in forming the pins 5, I have found that best results follow the employment of wooden pins, inasmuch as they may be very cheaply provided, and should any undue strain be brought to bear thereon the pins will break instead of breaking the beams.

To each outer end of the beams 3 I secure the clips 6, provided, as is common, with the plate 7 and the retaining-nuts 8, said clip being designed to engage the shank 9 of the blade 10, said shank and blade being part of the ordinary scythe-blade, the shank being provided with the curved anchoring stem or branch 11, designed to be engaged by the eyebolt 12, which is arranged to extend through any preferred one of the apertures 13, provided in the beam 3, the end of said bolt being securely locked in an adjusted position by the nut 14.

My improved attachment for cultivators or the like may be readily disposed in its operative position by entering the shanks 2 of the plow in the apertures 4 of the beam, which will dispose the beam so that it will lie substantially parallel with the axle of the cultivator, and will therefore extend outward and dispose the blade 10 obliquely with respect to the axle of the plow, and thus insure that the stalks will be severed as the blade comes in contact therewith.

It will be obvious that the ordinary scythe-blade may be employed by connecting the same to the outer ends of the beams 3 in the manner set forth, a right and left handed blade being used for this purpose, while it will also be understood that any preferred form of blade may be used for the purpose specified.

In order that the knives 10 may be properly disposed so as to cut the rows of standing stalks, it becomes desirable to adjustably secure the shanks of the plow with respect to each other, and in order to accomplish this I provide a connecting-link for said parts consisting of the U-shaped or central portion 15, each end of which terminates in a horizontal section 16, each horizontal section being provided with pairs of apertures 17, designed to receive the clip 18, (shown in Fig. 2,) the U-shaped portion of said clip being designed to partly encircle the outer shank 2 of the plow, while the ends of the clip are received in the apertures 17 and properly held in place by suitable nuts 18.

By the combination and construction of parts described in the foregoing specification, considered in connection with the accompanying drawings, it will be seen that my improved attachment, designed to be used in connection with any style of cultivator, may be very cheaply manufactured and applied to use. The parts thereof may be properly and easily adjusted, so that the cutting-blades will be disposed in any preferred angle and at any required distance apart so as to surely come in contact with the rows of standing stalks or weeds which it is desired shall be cut. After my improved attachment has been properly adjusted in position the cultivator is drawn over the ground in the usual manner and the blades will come in contact with the standing stalks, striking them obliquely with respect to the blade and will insure that the driest and toughest of them will be instantly severed. The various parts may be constructed of any desired material deemed most suitable for the purpose, and while I have described the preferred construction and combination of parts I desire to comprehend in this application all such substantial equivalents and substitutes as may be considered to fall fairly within the scope of my invention.

Having thus described my improved attachment for cultivators or the like, what I claim as new, and desire to secure by Letters Patent, is—

The herein-described attachment for cultivators comprising the beam-sections 3 provided with apertures 4 of suitable size and shape to receive the shank of a cultivator; suitable means to adjustably secure said beam to said shanks, in combination with a cutting-blade and means to attach the cutting-blade to the ends of the beams and a yoke having a curved central portion 15 and horizontal sections 16 adapted to adjustably secure the shanks of the cultivator in operative relationship to each other, all combined substantially as specified and for the purpose set forth.

In testimony whereof I affix my signature in presence of two witnesses.

ROBERT LEE KERR.

Witnesses:
J. H. SNEED,
W. T. BEVERLY.